(12) United States Patent
White et al.

(10) Patent No.: US 10,780,850 B2
(45) Date of Patent: Sep. 22, 2020

(54) AIRCRAFT SUPPLEMENTAL ELECTRICAL POWER SYSTEMS AND METHODS

(71) Applicant: THE BOEING COMPANY, Chicago, IL (US)

(72) Inventors: Jeffrey Joseph White, Shoreline, WA (US); Thomas F. Currier, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 55 days.

(21) Appl. No.: 16/123,685

(22) Filed: Sep. 6, 2018

(65) Prior Publication Data

US 2019/0016280 A1    Jan. 17, 2019

Related U.S. Application Data

(63) Continuation of application No. 14/516,208, filed on Oct. 16, 2014, now Pat. No. 10,093,250.

(51) Int. Cl.
| | |
|---|---|
| *B60R 16/03* | (2006.01) |
| *H02J 3/06* | (2006.01) |
| *H02J 3/38* | (2006.01) |

(52) U.S. Cl.
CPC ............... *B60R 16/03* (2013.01); *H02J 3/06* (2013.01); *H02J 3/38* (2013.01); *B64D 2221/00* (2013.01)

(58) Field of Classification Search
CPC .... B60R 16/03; H02J 3/06; H02J 3/38; B64D 2221/00
See application file for complete search history.

(56) References Cited

U.S. PATENT DOCUMENTS

| | | | |
|---|---|---|---|
| 4,967,097 A | 10/1990 | Mehl | |
| 5,627,744 A | 5/1997 | Baker et al. | |

(Continued)

FOREIGN PATENT DOCUMENTS

| | | |
|---|---|---|
| EP | 2541723 A1 | 1/2013 |
| WO | 9008893 A1 | 8/1990 |

OTHER PUBLICATIONS

Andrade, L. et al., "Design of the Boeing 777 electric system," Proceedings of the National Aerospace and Electronics Conference, May 18-22, 1992; New York, IEEE, US, vol. Conf. 44, May 18, 22, pp. 1281-1290.

(Continued)

*Primary Examiner* — Jared Fureman
*Assistant Examiner* — Emmanuel Dominique
(74) *Attorney, Agent, or Firm* — Armstrong Teasdale LLP (57) ABSTRACT

Supplemental power systems for aircraft are described. One example is a power conversion system for an electrical power system in a twin engine aircraft having a first generator and a second generator is described. The power conversion system includes a first branch, a second branch, and a selector. The first branch has a first input, a first power converter, and a first output configured for coupling to an aircraft electrical distribution system. The second branch includes a second input, a second power converter, and a second output configured for coupling to the aircraft electrical distribution system. The selector is coupled between the first branch and the second branch. The selector is configured to selectively connect the first generator to the first branch or to the first and second branches. The selector is also configured to selectively connect the second generator to the second branch or the first and second branches.

16 Claims, 5 Drawing Sheets

(56) References Cited

U.S. PATENT DOCUMENTS

| | | | |
|---|---|---|---|
| 5,813,630 A | 9/1998 | Williams | |
| 6,037,752 A * | 3/2000 | Glennon | H05K 7/1432 |
| | | | 322/22 |
| 6,344,700 B1 | 2/2002 | Eisenhauer et al. | |
| 6,503,649 B1 | 1/2003 | Czajkowski et al. | |
| 6,992,403 B1 * | 1/2006 | Raad | F02C 7/275 |
| | | | 290/10 |
| 7,116,003 B2 * | 10/2006 | Hoppe | F01D 15/10 |
| | | | 290/1 A |
| 7,207,521 B2 | 4/2007 | Atkey et al. | |
| 7,254,465 B2 | 8/2007 | McGinley | |
| 7,868,621 B2 * | 1/2011 | Liu | G01R 31/008 |
| | | | 324/512 |
| 7,950,606 B2 | 5/2011 | Atkey et al. | |
| 8,738,268 B2 | 5/2014 | Karimi et al. | |
| 10,287,030 B2 * | 5/2019 | Lutze | H02M 5/458 |
| 2004/0119454 A1 | 6/2004 | Chang et al. | |
| 2009/0228223 A1 * | 9/2009 | Liu | H04B 3/546 |
| | | | 702/59 |
| 2009/0326737 A1 * | 12/2009 | Derouineau | B64D 13/06 |
| | | | 701/3 |
| 2010/0193630 A1 * | 8/2010 | Duces | H02J 4/00 |
| | | | 244/58 |
| 2017/0197730 A1 * | 7/2017 | Lutze | B64D 47/00 |

OTHER PUBLICATIONS

European Search Report issued in European Application No. 15181785.5 dated Dec. 17, 2015.
Chinese Office Action and Search Report regarding Chinese Patent Application No. 2015106745154 dated Feb. 3, 2019; pp. 1-11.

* cited by examiner

AIRCRAFT SUPPLEMENTAL ELECTRICAL POWER SYSTEMS AND METHODS

CROSS-REFERENCE TO RELATED APPLICATIONS

This application is a continuation of and claims priority to U.S. patent application Ser. No. 14/516,208, filed Oct. 16, 2014, for "AIRCRAFT SUPPLEMENTAL ELECTRICAL POWER SYSTEMS AND METHODS", which is incorporated by reference herein in its entirety.

BACKGROUND

The present disclosure relates generally to aircraft electrical power systems, and more particularly to supplemental electrical power systems and methods for twin engine aircraft.

Modern aircraft include a large number of electrically powered loads. Electrically powered loads include, for example, cabin services, avionics, communications systems, fuel pumps, galley refrigeration, fans, lighting, etc. To provide electrical power for the various loads, an aircraft typically includes at least one generator mechanically coupled to at least one of the aircraft's engine(s). The generator's output electrically powers the aircraft's power distribution system.

In some know twin engine aircraft, each engine has a generator coupled to its gearbox. The main generator may contain a transmission that helps ensure that the generator is driven at a substantially constant speed to produce a substantially constant output. The alternating current (AC) outputs of the two main generators are coupled to the power distribution system to power the aircraft's electrically powered loads. The main generators are sized to be capable of providing enough power for all of the electrically powered loads. A backup generator is also coupled to each of the two engines. The backup generators are used to back up the main generators during abnormal conditions. The backup generators may produce a variable frequency output that may be converted to a fixed frequency. In this case, the variable frequency output power of a backup generator is rectified and supplied to a direct current (DC) bus. The DC bus is connected to an inverter that produces a substantially fixed frequency and magnitude AC output from the DC input. The AC output of the inverter may then be used to power at least some of the electrically powered loads. The backup generators may be required to comply with various regulations, but the backup generators are typically not used under normal operating conditions.

BRIEF DESCRIPTION

In one aspect, a supplemental electrical power system for use in a twin engine aircraft is described. The twin engine aircraft has a first and a second main generator driven by a first and second engine. The first and second main generators are coupled to provide power to a power distribution system in the aircraft. The supplemental electrical power system includes a first supplemental generator driven by the first engine, a second supplemental generator driven by the second engine, a first power converter, a second power converter, and a selector. The first power converter has a first input and a first output. The first input is coupled to the first supplemental generator. The first output is coupled to the power distribution system. The second power converter has a second input and a second output. The second input is coupled to the second supplemental generator. The second output is coupled to the power distribution system. The selector is connected between the first and second power converters to permit selective connection of the first and second inputs.

In another aspect, a power conversion system for an electrical power system in a twin engine aircraft having a first generator and a second generator is described. The power conversion system includes a first branch, a second branch, and a selector. The first branch has a first input, a first power converter, and a first output configured for coupling to an aircraft electrical distribution system. The second branch includes a second input, a second power converter, and a second output configured for coupling to the aircraft electrical distribution system. The selector is coupled between the first branch and the second branch. The selector is configured to selectively connect the first generator to the first branch or to the first and second branches. The selector is also configured to selectively connect the second generator to the second branch or the first and second branches.

In another aspect, an electrical power system for use in a twin engine aircraft having a first engine, a second engine, and a plurality of electrically powered loads is described. The electrical power system includes a first main generator, a second main generator, a first supplemental generator, a second supplemental generator, and a power conversion system. The first main generator is driven by the first engine and coupled to a power distribution system. The second main generator is driven by the second engine and coupled to the power distribution system. The first and second main generators have a combined output power less than a maximum power requirement of the plurality of electrically powered loads. The first supplemental generator is driven by the first engine. The second supplemental generator is driven by the second engine. The first and second supplemental generators have a combined supplemental output power greater than a difference between the combined output power of the first and second main generators and the maximum power requirement of the plurality of electrically powered loads. The power conversion system is coupled to the first and second supplemental generators. The power conversion system is configured to selectively couple power from the first and second supplemental generators to the power distribution system.

DETAILED DESCRIPTION

The present disclosure relates generally to aircraft electrical power systems. More particularly, this disclosure relates to supplemental electrical power systems for twin engine aircraft.

The exemplary power systems described herein include a main power system and a supplemental power system. The supplemental power system may function as both a backup power system for the main power system and a supplement to the main power system. Thus, the example implementations may allow smaller main power generators to be used in aircraft. Reducing the size of the main power generators reduces the weight of the aircraft and redistributes the load on the aircraft's engines, and thereby increases the efficiency of the aircraft.

Figure 1:
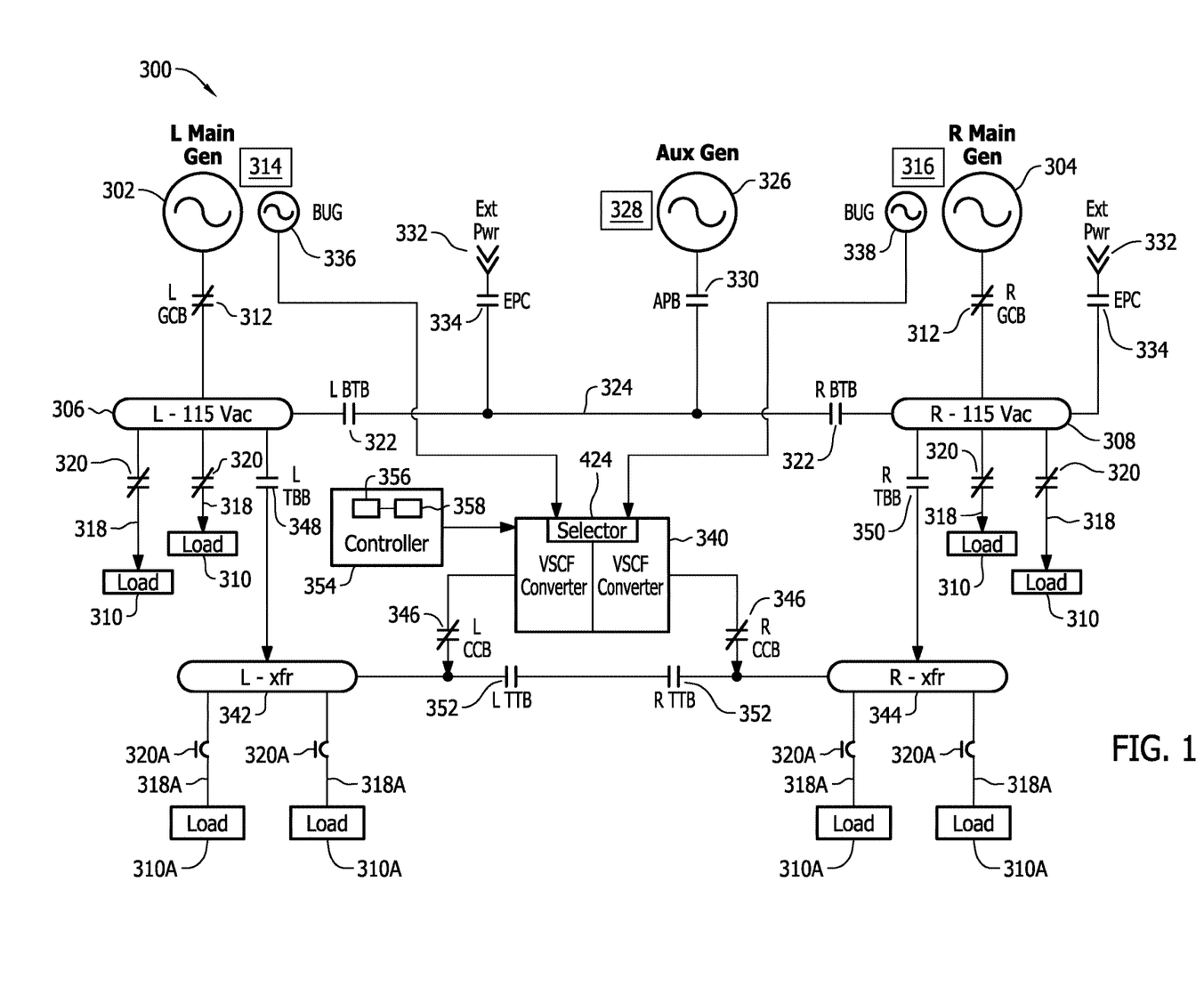
FIG. 1 is a one-line diagram of an exemplary electrical power system for a twin engine aircraft.
Figure 2:
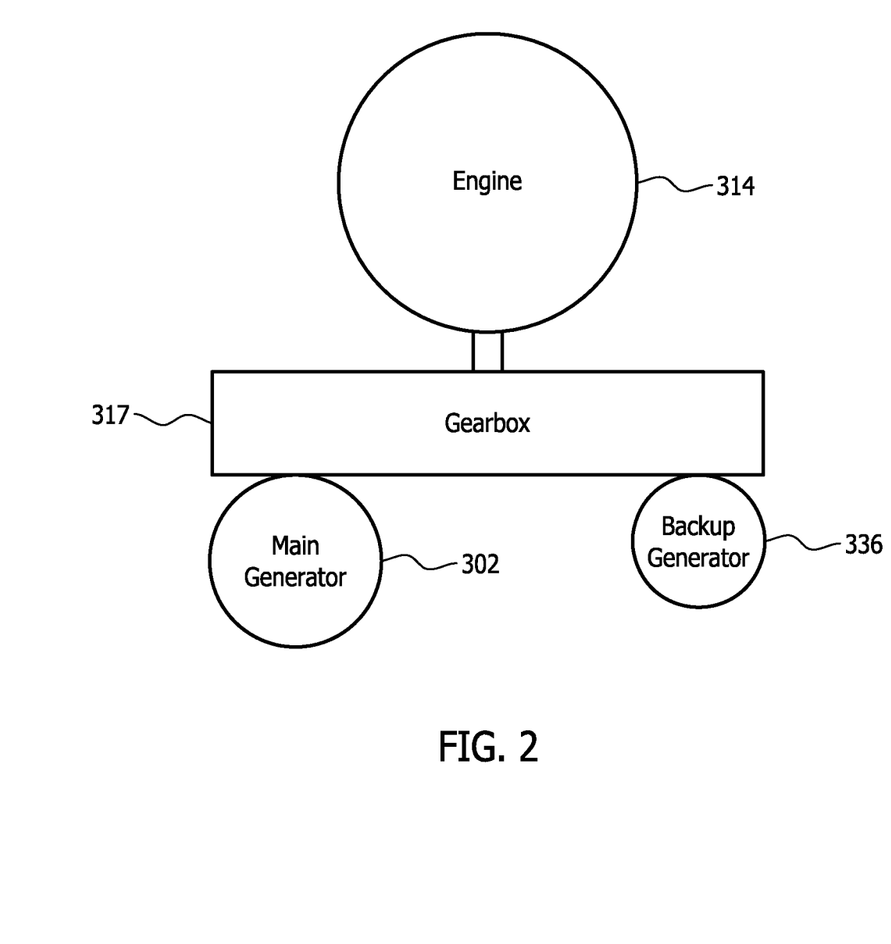
FIG. 2 is a mechanical diagram of a portion of the electrical power system shown in FIG. 1.

FIG. 1 is a one-line diagram of an electrical power system 300 for a twin engine aircraft (not shown). FIG. 2 is a simplified diagram of the mechanical components of a portion of electrical power system 300. With reference to FIG. 1, power system 300 includes a main power system including a first main generator 302, a second main generator 304, a first distribution bus 306, and a second distribution bus 308. The main power system provides electrical power from first main generator 302 and second main generator 304 to loads 310 and 310A via busses 306, 308, 342, and 344. First and second generators 302 and 304 are connected to first and second busses 306 and 308 through generator circuit breakers 312. Although the exemplary implementation is a three phase system, for clarity FIG. 1 shows conductors for a single phase of electricity. Other implementations may include any number of phases, including a single phase or two phases.

First main generator 302 is mechanically coupled to a first engine 314 and second main generator 304 is mechanically coupled to a second engine 316. FIG. 2 is a simplified diagram of the mechanical connection of first main generator 302 to a gearbox 317 of first engine 314. Second main generator 304 is similarly connected to second engine 316 via a gearbox 317. Main generators 302 and 304 may be fixed or variable frequency generators when driven by first and second engines 314 and 316. In an example implementation, main generators 302 and 304 are mechanically coupled to gearboxes 317 of first and second engines 314 and 316 via mechanical transmission systems (not shown) that rotate main generators 302 and 304 at a substantially constant speed regardless of the rotational speed of first and second engines 314 and 316.

First and second distribution buses 306 and 308 are connected to loads 310 by load conductors 318 and load circuit breakers 320. In the example implementation, first distribution bus 306 and second bus 308 each provide power to different loads 310. First main generator 302 generally provides power to loads 310 that are connected to first distribution bus 306, and second main generator 304 generally provides power to loads 310 that are connected to second distribution bus 308. First distribution bus 306 and second distribution bus 308 are selectively connectable via bus tie breakers 322 and conductors 324 to permit either or both main generators 302 and 304 to provide power to both of first and second distribution bus 306 and 308.

An auxiliary generator 326 is mechanically coupled to and driven by an auxiliary engine 328. In the example implementation, auxiliary engine 328 operates at a substantially constant speed and is directly (i.e., without a mechanical transmission system) connected to auxiliary generator 326. Auxiliary engine 328 drives auxiliary generator 326 at a substantially constant speed to produce a substantially constant output. The AC output of auxiliary generator 326 is selectively connectable to first and/or second bus 306 or 308 via an auxiliary power breaker 330 and bus tie breakers 322.

First and second distribution bus 306 and 308, bus tie breakers 322, conductors 318 and 324, and load circuit breakers 320 form part of a power distribution system for the aircraft. External power may be connected to the power distribution system through external power ports 332 and their associated external power contactors 334.

Power system 300 includes a supplemental power system including a first supplemental generator 336, a second supplemental generator 338, a power conversion system 340, a first transfer bus 342, and a second transfer bus 344. Typically, the supplemental power system provides electrical power to supplement the power provided by the main power system and to back up the main power system. In the example implementation, the supplemental power system is configured (e.g., sized, rated, etc.) to provide sufficient power to power loads 310A (which may be referred to as a subset of all loads). Thus, the supplemental power system can back up the main power system and provide power to loads 310A if first and/or second main generator 302 and/or 304 is unable to provide power to first transfer bus 342 and/or second transfer bus 344. In some implementations, loads 310A are important loads, such as navigation systems, fuel pumps, etc. In such implementations, first and second supplemental generators 336 and 338 may operate less than continuously (e.g., only when one of first and second main generators 302 and 304 is not outputting power).

First and second transfer buses 342 and 344 are connected to loads 310A by load conductors 318A and load circuit breakers 320A. In the example implementation, first distribution bus 306 and second distribution bus 308 provide power to transfer buses 342 and 344 through power contactors 348 and 350 during normal operation. Upon a loss of power to first distribution bus 306, contactor 348 is opened and converter circuit breaker 346 is closed, allowing first transfer bus 342 to be powered from the supplemental power system converter 340. Upon loss of power to second distribution bus 308, contactor 350 is opened and converter circuit breaker 346 is closed, allowing second transfer bus 344 to be powered from supplemental power system converter 340.

In some implementations, the supplemental power system outputs electrical power to the power distribution system when first and second main generators 302 and 304 are both operating (e.g., first and second supplemental generators 336 and 338 are continuously operated). In an example implementation, the main power system is configured to provide sufficient power for all of electrically powered loads 310 and 310A under normal operating conditions, but not enough power for all loads 310 and 310A during peak power demand situations without load shedding. The supplemental power system is configured to provide an amount of power at least greater than the difference between the main power system's maximum power output and the peak power demand of all loads 310 and 310A. In other implementations, the main power system is configured to provide a power output that is insufficient to power all loads 310 and 310A and the supplemental power system is configured to provide a combined power output greater than the difference between the maximum power output of the main power system and the peak power demand for all loads 310. Implementations in which the supplemental power system supplements (rather than only backing up) the main power system permit optimizing of the size of first and second main generators 302 and 304.

First supplemental generator 336 is mechanically coupled to and driven by first engine 314 and second supplemental generator 338 is mechanically coupled to and driven by second engine 316. FIG. 2 includes a simplified diagram of the mechanical connection of first supplemental generator 336 to gearbox 317 of first engine 314. Second supplemental generator 336 is similarly connected to second engine 316 via a gearbox 317. First and second supplemental generators 336 and 338 are directly (i.e., without a mechanical transmission system to provide speed regulation) connected to the gearboxes 317 of their respective engines 314 and 316. Because the speed of first and second engines 314 and 316 varies as the aircraft is operated, the speed at which supplemental generators 336 and 338 are operated is varied. The AC output of supplemental generators varies in magnitude and frequency as the speed of first and second engines 314 and 316 is varied.

The variable output from first and second supplemental generators 336 and 338 is input to power conversion system 340. Power conversion system 340 converts the variable magnitude, variable frequency input to an output with a substantially constant magnitude and frequency. Power conversion system 340 converts the input to an AC output with a magnitude and frequency that substantially matches the magnitude and frequency of the AC output from first and second main generators 302 and 304.

Power conversion system 340 is configured to selectively couple power from first and second supplemental generators 336 and 338 to the power distribution system. More particularly, the output of power conversion system 340 is selectively coupled to first transfer bus 342 and second transfer bus 344 through converter circuit breakers 346. As will be described in more detail below, power conversion system 340 includes a selector 424 for selectively coupling the input from first supplemental generator 336 to first transfer bus 342, second transfer bus 244, or first and second transfer buses 342 and 344. The input from second supplemental generator 338 is selectively coupled by the selector to second transfer bus 344, first transfer bus 342, or first and second transfer buses 342 and 344. First transfer bus 342 is selectively coupleable (via transfer bus breaker 348) to first distribution bus 306, and second transfer bus is selectively coupleable (via transfer bus breaker 350) to second distribution bus 308. First and second transfer buses 342 and 344 are selectively coupled together by transfer tie breakers 352.

A controller 354 controls operation of power conversion system 340. Controller 354 may be a dedicated power conversion system controller or may be part of another controller, such as a power system 300 controller. Controller 354 controls operation of power conversion system 340 to convert the variable input from supplemental generators 336 and 338 to the fixed frequency and fixed magnitude output of conversion system 340. Controller 354 also controls the selector to control selective coupling of its input to the transfer buses 342 and 344. In some implementations, controller 354 controls one or more of the breakers/contactors 320A, 346, 348, 350, and 352.

Controller 354 is and/or may be implemented in a computing device. Controller 354 includes a processor 356 and a memory 358. Generally, memory 358 stores instructions that, when executed by processor 356, cause controller 354 to operate as described herein. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor." Memory 358 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 354. Memory 354 may also be, or include, a detachable or removable memory, including, but not limited to, a suitable cartridge, disk, CD ROM, DVD or USB memory.

Figure 3:
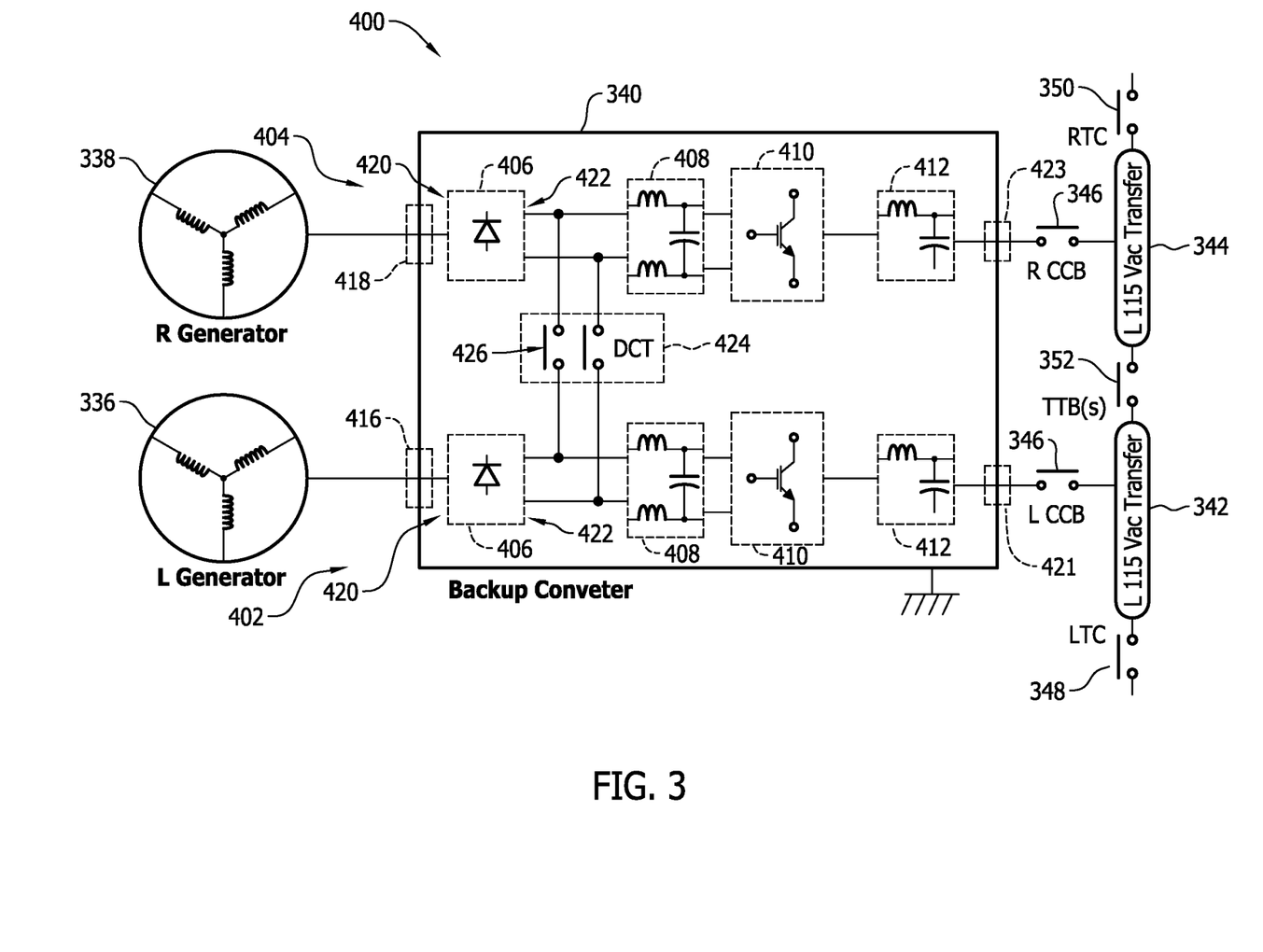
FIG. 3 is a supplemental electrical power system for use in the electrical power system shown in FIG. 1.

FIG. 3 is a diagram of an implementation of a supplemental electrical power system 400 for use in the electrical power system 300 shown in FIGS. 1 and 2. Common components are identified by the same reference numbers and function in substantially the same manner unless otherwise specified.

In electrical power system 400, power conversion system 340 includes a first branch 402 and a second branch 404. First and second branches 402 and 404 are substantially identical. Each branch 402 and 404 includes a power converter and may be referred to as a first power converter and a second power converter. More specifically, each branch 402 and 404 includes a rectifier 406, an input filter 408, an inverter 410, and an output filter 412. The output of first supplemental generator 336 is coupled to a first input 416. The output of second supplemental generator 338 is coupled to a second input 418.

First and second inputs are coupled to rectifiers 406 in first branch 402 and second branch 404, respectively. Rectifiers 406 are any suitable circuit for rectifying a varying AC output of supplemental generators 336 or 338 to a substantially direct current (DC) output. In some implementations, rectifier 406 includes one or more diodes. Each rectifier 406 has an input side 420 and an output side 422. Each input side 420 is connected to first or second input 416 or 418.

Output sides 422 of rectifiers 406 are connected to input filters 408. Input filters 408 smooth out the rectified input to conversion system 340 before providing the filtered input to inverters 410. Input filters 408 may be any filter suitable for filtering a substantially DC input. Inverters 410 receive a filtered DC input from input filters 408 and convert the input to an AC output. Inverters 410 may be any inverter topology suitable for converting a DC input to an AC output. The output from each inverter 410 is coupled to output filter 412 for filtering prior to being output through a first output 421 and a second output 423 to be coupled (via transfer buses 342 and 344) to the aircraft's electrical distribution system. Alternatively, the output filter 412 may be implemented in separate parts to filter differential mode and common mode noise on the power lines due to inverter 410 switching. In some implementations, the input and output common mode or differential mode filter components may be combined. In other implementations, the amount of filtering may be reduced or eliminated.

A selector 424 is connected between the first and second branch to allow selective connection (such as under the control of controller 354) of first and second inputs 416 and 418. Thus, the output of first supplemental generator 336 may be connected to first branch 402 or, if inputs 416 and 418 are connected by selector 424, to first and second branches 402 and 404. Similarly, the output of second supplemental generator 338 may be connected to second branch 404 or to second branch 404 and first branch 402. Selector 424 permits first branch 402 and second branch 404 to each receive an input from a separate power source (one of generators 336 or 338), to both operate in parallel with an input from only one power source, or to operate in parallel with a combined input from both power sources. In the exemplary implementation, selector 424 includes a DC tie 426. Controller 354 is communicatively coupled to DC tie 426 and can close DC tie 426 to connect first and second inputs 416 and 418 or open DC tie 426 to separate first and second inputs 416 and 418. In other implementations, selector 424 includes one or more power contactors, switches, relays, switchgear, semi-conductor switches, or any other suitable power switching device.

Figure 4:
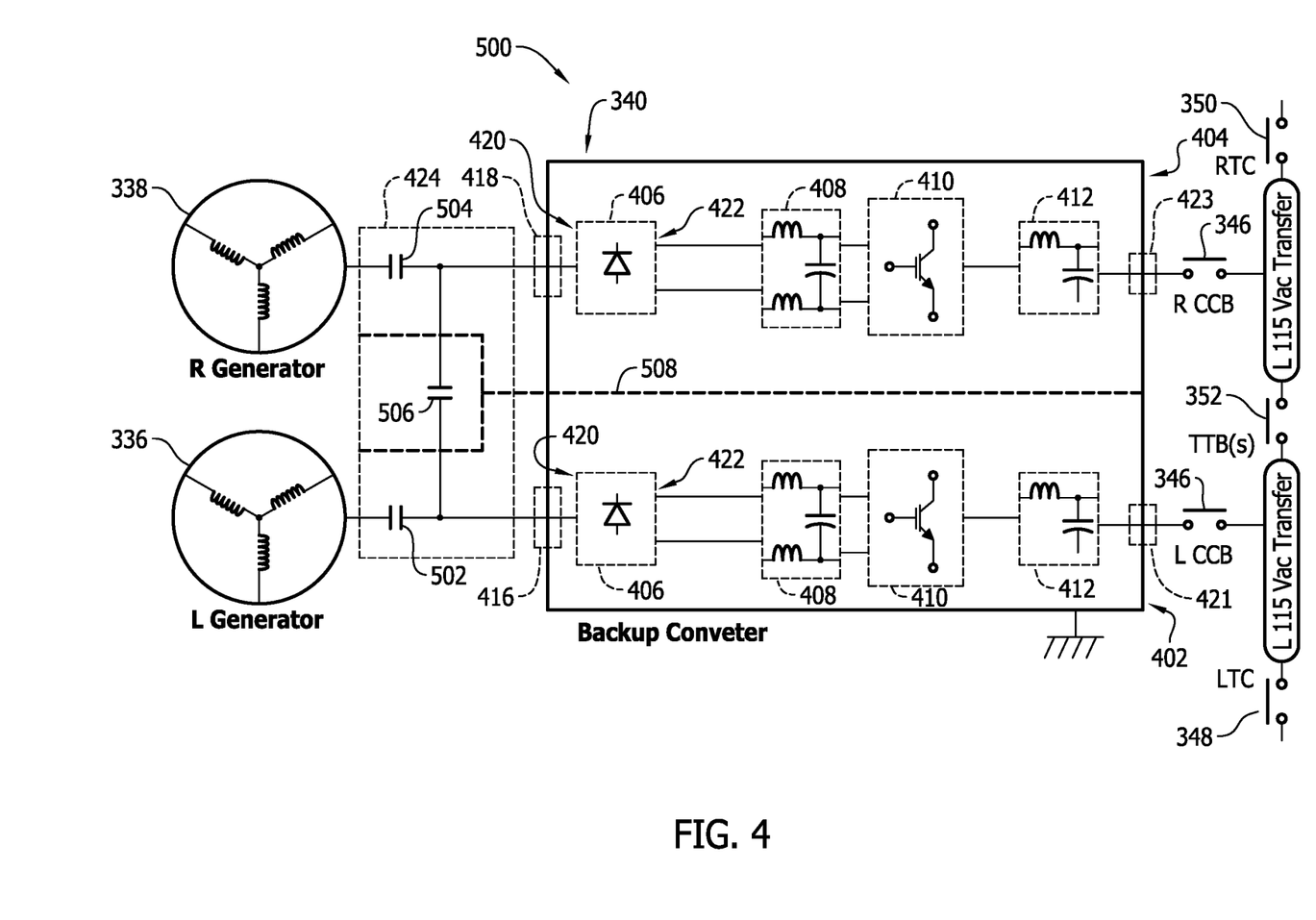
FIG. 4 is another supplemental electrical power system for use in the electrical power system shown in FIG. 1.

FIG. 4 is a diagram of an implementation of another supplemental electrical power system 500 for use in the electrical power system 300 shown in FIGS. 1 and 2. Common components are identified by the same reference numbers in FIGS. 1-4, and function in substantially the same manner unless otherwise specified.

In power system 500, selector 424 is located on the input side 420 of rectifiers 406. Selector 424 is coupled to first branch 402 between first input 416 and first supplemental generator 336 and is coupled to second branch 404 between second input 418 and second supplemental generator 338. Thus, the input to selector 424 in system 500 is the unrectified, AC output of generators 336 and 338. First generator 336 is coupled to first branch 402 through a first backup generator circuit breaker 502. Second generator 338 is coupled to second branch 404 through a second backup generator circuit breaker 504. Tie breaker 506 is connected between first and second backup generator circuit breakers 502 and 504. By opening and closing tie breaker 506, controller 354 selectively couples together first and second inputs 416 and 418. A firewall 508 separates first and second branches 402 and 404 from each other and from tie breaker 506.

Figure 5:
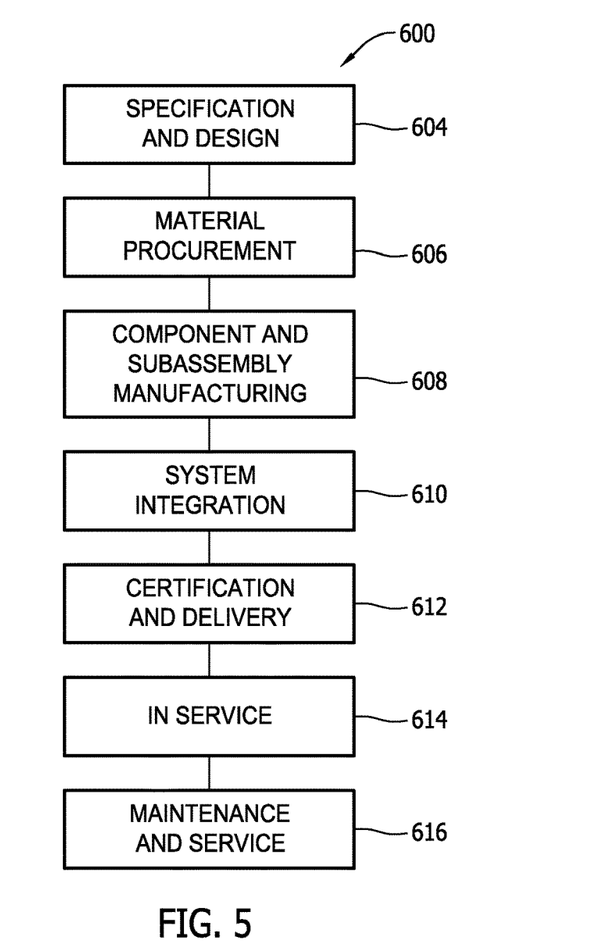
FIG. 5 is a flow diagram of an exemplary aircraft production and service methodology.
Figure 6:
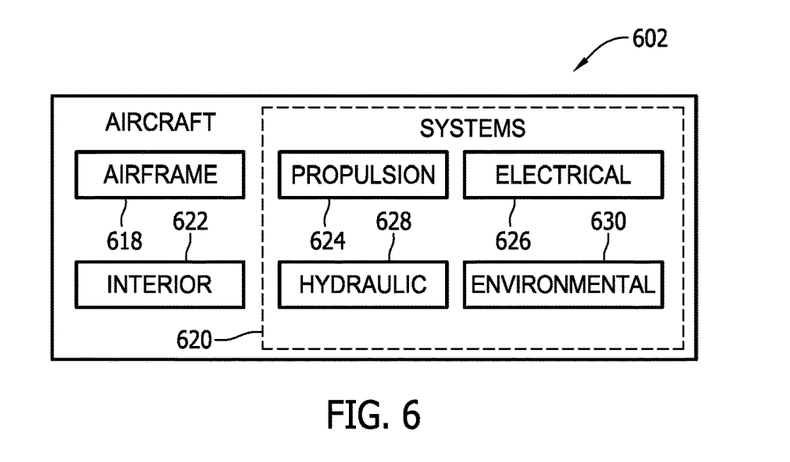
FIG. 6 is a block diagram of an exemplary aircraft.

With reference to FIGS. 5 and 6, implementations of the disclosure may be described in the context of an aircraft manufacturing and service method 600 (shown in FIG. 5) and via an aircraft 602 (shown in FIG. 6). During preproduction, including specification and design 604 data of aircraft 602 may be used during the manufacturing process and other materials associated with the airframe may be procured 606. During production, component and subassembly manufacturing 608 and system integration 610 of the aircraft 602 occurs, prior to aircraft 602 entering its certification and delivery process 612. Upon successful satisfaction and completion of airframe certification, aircraft 602 may be placed in service 614. While in service by a customer, aircraft 602 is scheduled for periodic, routine, and scheduled maintenance and service 616, including any modification, reconfiguration, and/or refurbishment, for example.

Each portion and process associated with aircraft manufacturing and/or service 600 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, an aircraft 602 produced via method 600 may include an airframe 618 having a plurality of systems 620 and an interior 622. Examples of high-level systems 620 include one or more of a propulsion system 624, an electrical system 626, a hydraulic system 628, and/or an environmental system 630. Any number of other systems may be included. Although an aircraft example is shown, the principles of the invention may be applied to non-aviation industries, such as the automotive industry.

Apparatus and methods embodied herein may be employed during any one or more of the stages of method 600. For example, components or subassemblies corresponding to component production process 608 may be fabricated or manufactured in a manner similar to components or subassemblies produced while aircraft 602 is in service. Also, one or more apparatus implementations, method implementations, or a combination thereof may be utilized during the production stages 608 and 610, for example, by substantially expediting assembly of, and/or reducing the cost of assembly of aircraft 602. Similarly, one or more of apparatus implementations, method implementations, or a combination thereof may be utilized while aircraft 602 is being serviced or maintained, for example, during scheduled maintenance and service 616.

The exemplary power systems described herein include a main power system and a supplemental power system. The supplemental power system may function as both a backup power system for the main power system and a supplement to the main power system. Thus the example implementations may allow smaller main power generators to be used in aircraft. Reducing the size of the main power generators reduces the weight of the aircraft and redistributes the load on the aircraft's engines, and thereby increases the efficiency of the aircraft.

The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A supplemental electrical power system for use in a twin engine aircraft having a first and a second main generator driven by a first and second engine, the first and second main generators coupled to provide power to a power distribution system in the aircraft, said supplemental electrical power system comprising:
a first supplemental generator driven by the first engine;
a second supplemental generator driven by the second engine;

a first power converter including a first input and a first output, said first input coupled to said first supplemental generator, said first output coupled to the power distribution system, said first power converter comprising a first rectifier coupled between said first input and said first output;

a second power converter including a second input and a second output, said second input coupled to said second supplemental generator, said second output coupled to the power distribution system, said second power converter comprising a second rectifier coupled between said second input and said second output; and a selector connected between said first and second power converters to permit selective connection of said first and second inputs, wherein said selector is connected to said first power converter between said first rectifier and said first output, and connected to said second power converter between said second rectifier and said second output, wherein said selector comprises a direct current tie contactor, and wherein said direct current tie contactor is directly coupled to said first and second rectifiers.

2. A supplemental electrical power system in accordance with claim 1, wherein said first power converter comprises a first inverter coupled between said first rectifier and said first output, and wherein said second power converter comprises a second inverter coupled between said second rectifier and said second output.

3. A supplemental electrical power system in accordance with claim 1, further comprising a controller communicatively coupled to said selector and configured to operate said selector to control a flow of power between said first and second supplemental generators and said first and second power converters.

4. A supplemental electrical power system in accordance with claim 1, wherein said first and second supplemental generators are continuously coupled to said first and second engines to provide power to supplement and back-up the first and second main generators.

5. A supplemental electrical power system in accordance with claim 1, wherein said first power converter comprises a first input filter coupled between said first rectifier and said first output, and wherein said second power converter comprises a second input filter coupled between said second rectifier and said second output.

6. A supplemental electrical power system in accordance with claim 5, wherein said direct current tie contactor is coupled between a first node located between said first rectifier and said first input filter and a second node located between said second rectifier and said second input filter.

7. A power conversion system for an electrical power system in a twin engine aircraft having a first generator and a second generator, said power conversion system comprising:

a first branch including a first input, a first power converter comprising a first rectifier, and a first output configured for coupling to an aircraft electrical distribution system;

a second branch including a second input, a second power converter comprising a second rectifier, and a second output configured for coupling to the aircraft electrical distribution system; and a selector coupled between said first branch and said second branch, said selector configured to selectively connect the first generator to said first branch or said first and second branches, and to selectively connect the second generator to said second branch or said first and second branches, wherein said selector is connected to said first power converter between said first rectifier and said first output, and connected to said second power converter between said second rectifier and said second output, wherein said selector comprises a direct current tie contactor, and wherein said direct current tie contactor is directly coupled to said first and second rectifiers.

8. A power conversion system in accordance with claim 7, wherein said first power converter comprises a first inverter, wherein said second power converter comprises a second inverter, wherein said first rectifier has an input side coupled to said first input and an output side coupled to said first inverter, and wherein said second rectifier has an input side coupled to said second input and an output side coupled to said second inverter.

9. A power conversion system in accordance with claim 7, wherein said first power converter comprises a first input filter coupled between said first rectifier and said first output, and wherein said second power converter comprises a second input filter coupled between said second rectifier and said second output.

10. A power conversion system in accordance with claim 9, wherein said direct current tie contactor is coupled between a first node located between said first rectifier and said first input filter and a second node located between said second rectifier and said second input filter.

11. An electrical power system for use in a twin engine aircraft having a first engine, a second engine, and a plurality of electrically powered loads, said electrical power system comprising:

a first main generator driven by the first engine and coupled to a power distribution system;

a second main generator driven by the second engine and coupled to the power distribution system, said first and second main generator having a combined output power less than a maximum power requirement of the plurality of electrically powered loads;

a first supplemental generator driven by the first engine;

a second supplemental generator driven by the second engine, said first and second supplemental generators having a combined supplemental output power greater than a difference between the combined output power of said first and second main generators and the maximum power requirement of the plurality of electrically powered loads; and a power conversion system coupled to said first and second supplemental generators, said power conversion system configured to selectively couple power from said first and second supplemental generators to the power distribution system, said power conversion system comprising:

a first power converter comprising a first rectifier;

a second power converter comprising a second rectifier; and a selector connected between said first and second power converters to selectively couple power from said first and second generator to said first and second power converters, wherein said selector comprises a direct current tie contactor directly coupled to said first and second rectifiers.

12. An electrical power system in accordance with claim 11, wherein said first power converter further comprises a first inverter, and wherein said second power converter further comprises a second inverter.

13. An electrical power system in accordance with claim 11, wherein said first main generator is coupled to a first bus of the power distribution system, wherein said second main generator is coupled to a second bus of the power distribution system, wherein an output of said first power converter is selectively coupled the first bus, and wherein an output of said second power converter is selectively coupled to the second bus.

14. An electrical power system in accordance with claim 11, wherein said first and second power converters have a combined supplemental output power greater than a power requirement of a predetermined subset of the plurality of electrically powered loads.

15. An electrical power system in accordance with claim 11, wherein said first power converter comprises a first input filter coupled to said first rectifier, and wherein said second power converter comprises a second input filter coupled to said second rectifier.

16. An electrical power system in accordance with claim 15, wherein said direct current tie contactor is coupled between a first node located between said first rectifier and said first input filter and a second node located between said second rectifier and said second input filter.

* * * * *